(12) United States Patent
Mincher et al.

(10) Patent No.: US 10,270,797 B1
(45) Date of Patent: *Apr. 23, 2019

(54) SECURE WIRELESS NETWORK CREDENTIAL SHARING

(71) Applicant: Amazon Technologies, Inc., Seattle, WA (US)

(72) Inventors: Richard William Mincher, Cupertino, CA (US); David George Butler, San Jose, CA (US); Richard David Young, Mission Viejo, CA (US); Thomas Bruno Mader, Los Gatos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/082,110

(22) Filed: Mar. 28, 2016

Related U.S. Application Data (63) Continuation of application No. 14/136,733, filed on Dec. 20, 2013, now Pat. No. 9,301,141.

(51) Int. Cl.
   *G06F 7/04* (2006.01)
   *G06F 17/30* (2006.01)
   *H04N 7/16* (2011.01)
   *H04L 29/06* (2006.01)

(52) U.S. Cl.
   CPC ...... *H04L 63/1433* (2013.01); *H04L 63/1441* (2013.01)

(58) Field of Classification Search
   CPC .......................... H04L 63/1433; H04L 63/1441

USPC .......................................................... 726/25
See application file for complete search history.

(56) References Cited

U.S. PATENT DOCUMENTS

| | | | | |
|---|---|---|---|---|
| 8,316,438 | B1 * | 11/2012 | Bush ...................... | H04L 12/66 726/22 |
| 8,429,405 | B2 * | 4/2013 | Roth ...................... | H04W 12/04 380/277 |
| 8,588,698 | B2 * | 11/2013 | Brisebois ............... | H04W 88/06 455/63.1 |
| 2002/0161884 | A1 * | 10/2002 | Munger .................. | H04L 45/00 709/224 |
| 2006/0031438 | A1 * | 2/2006 | Tokuhashi ........... | H04N 21/643 709/223 |
| 2006/0041749 | A1 * | 2/2006 | Ptasinki ................ | H04W 12/06 713/168 |
| 2008/0195866 | A1 * | 8/2008 | Roth ...................... | H04W 12/04 713/171 |

(Continued)

OTHER PUBLICATIONS

Yong Sheng; Detecting 802.11 MAC Layer Spoofing Using Received Signal Strength; IEEE 2008; p. 1-9.*

*Primary Examiner* — Monjur Rahim
(74) *Attorney, Agent, or Firm* — Pierce Atwood LLP (57) ABSTRACT

A wireless communications system mitigates the threat of a man-in-the-middle attack when sharing network credentials with a new device. A new wireless device signals that it needs credentials if no other devices are signaling that they need credentials. The new device provides a visible or audible indicator when requested to do so by a device with credentials. Either in response to approval by a user or automatically in response to the indicator, the device with credentials shares credentials with the new device, which can then establish a connection to the network.

20 Claims, 7 Drawing Sheets

(56) References Cited

U.S. PATENT DOCUMENTS

| | | | | |
|---|---|---|---|---|
| 2009/0119776 A1* | 5/2009 | Palnitkar | ............... | G06Q 20/40 |
| | | | | 726/25 |
| 2010/0082176 A1* | 4/2010 | Chang | ............... | H02J 3/14 |
| | | | | 700/295 |
| 2010/0095356 A1* | 4/2010 | Han | ............... | H04L 9/3263 |
| | | | | 726/4 |
| 2010/0100930 A1* | 4/2010 | King | ............... | H04L 63/1433 |
| | | | | 726/1 |
| 2010/0191968 A1* | 7/2010 | Patil | ............... | H04L 9/3236 |
| | | | | 713/170 |
| 2012/0260329 A1* | 10/2012 | Suffling | ............... | H04L 63/1458 |
| | | | | 726/9 |
| 2012/0329430 A1* | 12/2012 | Chatani | ............... | H04L 12/12 |
| | | | | 455/411 |
| 2014/0071908 A1* | 3/2014 | Sachs | ............... | H04L 1/1893 |
| | | | | 370/329 |
| 2014/0181521 A1* | 6/2014 | Hemphill | ............... | H04L 9/0819 |
| | | | | 713/171 |
| 2014/0298427 A1* | 10/2014 | Bahr | ............... | H04L 63/08 |
| | | | | 726/4 |
| 2014/0344930 A1* | 11/2014 | Foley | ............... | H04L 63/1425 |
| | | | | 726/23 |
| 2015/0106887 A1* | 4/2015 | Aslund | ............... | H04L 63/0492 |
| | | | | 726/5 |

* cited by examiner

SECURE WIRELESS NETWORK CREDENTIAL SHARING

CROSS-REFERENCE TO RELATED APPLICATION

This application is a continuation of, and claims the benefit of priority of, U.S. Non-provisional patent application Ser. No. 14/136,733, filed Dec. 20, 2013 and entitled "Secure Wireless Network Credential Sharing," the contents of which is expressly incorporated herein by reference in its entirety

BACKGROUND

Physical devices that are not classically thought of as "personal computers" may now connect to the Internet. Devices ranging from soda machines to televisions to light bulbs may now have a network presence independent of any "traditional" personal computer. These devices represent a nascent of the "Internet of Things," where ordinary physical objects are seamlessly integrated into the information network, allowing them to be abstractly represented and interacted with remotely.

BRIEF DESCRIPTION OF DRAWINGS

For a more complete understanding of the present disclosure, reference is now made to the following description taken in conjunction with the accompanying drawings.

DETAILED DESCRIPTION

Every time a new wireless device is brought into the home, consumers must configure the device, providing the device the credentials (e.g., network name, password) of their local wireless network. One approach for this, especially on "displayless" devices without a built-in display screen or a connection to support/drive a display screen (sometimes referred to as "headless" devices), is to connect to an embedded web server built into the new device, enter the local wireless network access point's name (also known as its service set identifier or SSID for some protocols) and password into a web page provided by the web server, and submit these two pieces of information to the new device. Some people believe that the Hypertext Transfer Protocol-Secure (HTTPS) (also known as Hypertext Transfer Protocol over Secure Sockets Layer) is sufficient to secure the data for this transaction. However, unless the "certificate" used to validate security is properly signed by a recognized signing authority (which is administratively and financially expensive), and the signatures are checked (computationally expensive), a "man-in-the-middle" can eavesdrop on the transaction between the user and the new device, invisibly intercepting network credentials and allowing the eavesdropper to possibly acquire access to local network, monitor future communications, and gain control over the new wireless device.

Figure 1:
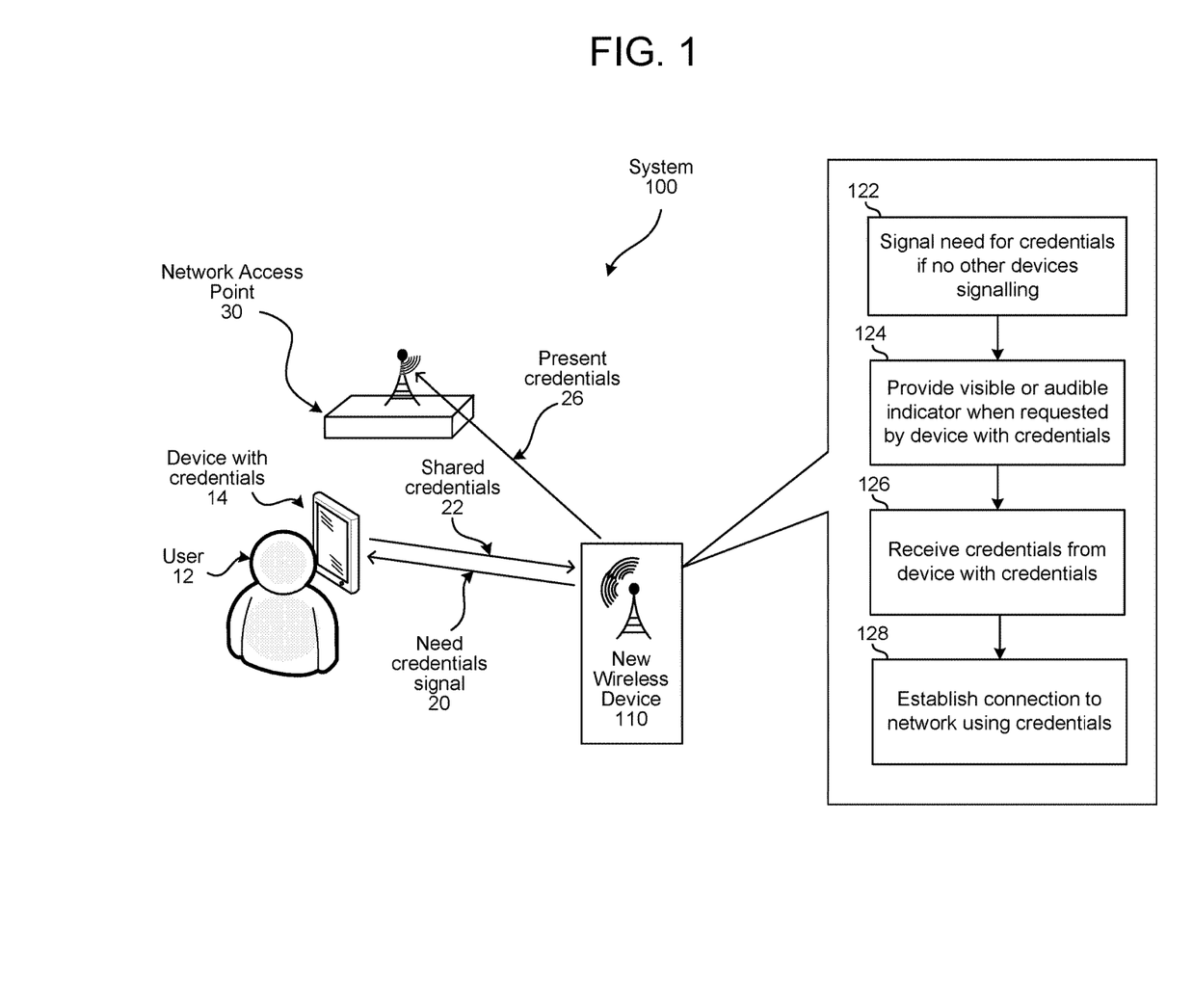
FIG. 1 illustrates a system for securely providing network credentials to a new device joining a network.

Referring to FIG. 1, a wireless communications system 100 utilizing a "displayless credentialing protocol" is disclosed to mitigate the threat of a man-in-the-middle attack in wireless communications without requiring the typical certificates and signature verification. The system may use a device 110 that is displayless and that may also or instead lack a conventional user input interface for direct data entry as is customarily found on computing devices (e.g., no keyboard, keypad, touch-sensitive component, etc.). The displayless credentialing protocol may be a protocol configured to exchange credentials between a credentialing device and a device that is displayless, but is capable of creating some other detectable indicator as described below. If no other devices are signaling that they need credentials (122), a new wireless device 110 signals (20) that it needs network credentials. If another device is signaling that it needs credentials, the new wireless device 110 may time out and try again later. After a device responds (i.e., the device with credentials 14) to the signal requesting credentials, the new device 110 provides (124) a visible, audible, or otherwise detectable indicator when requested to do so by a device with credentials 14. Either in response to approval by a user 12 or automatically in response to the indicator, the device with credentials 14 shares credentials (22), which the new device 110 receives (126). The new device 110 then establishes (128) a connection to the network, presenting the credentials (26) to a network access point 30 such a local area network router. By signaling the need for credentials (122) only if no other device is broadcasting a need for credentials signal, and providing the indicator (124) as verification for the device with credentials 14, and only accepting requests to provide the indicator if-and-only-if there are no other devices broadcasting a need for a credential, a man-in-the-middle attack may be thwarted.

Figure 2:
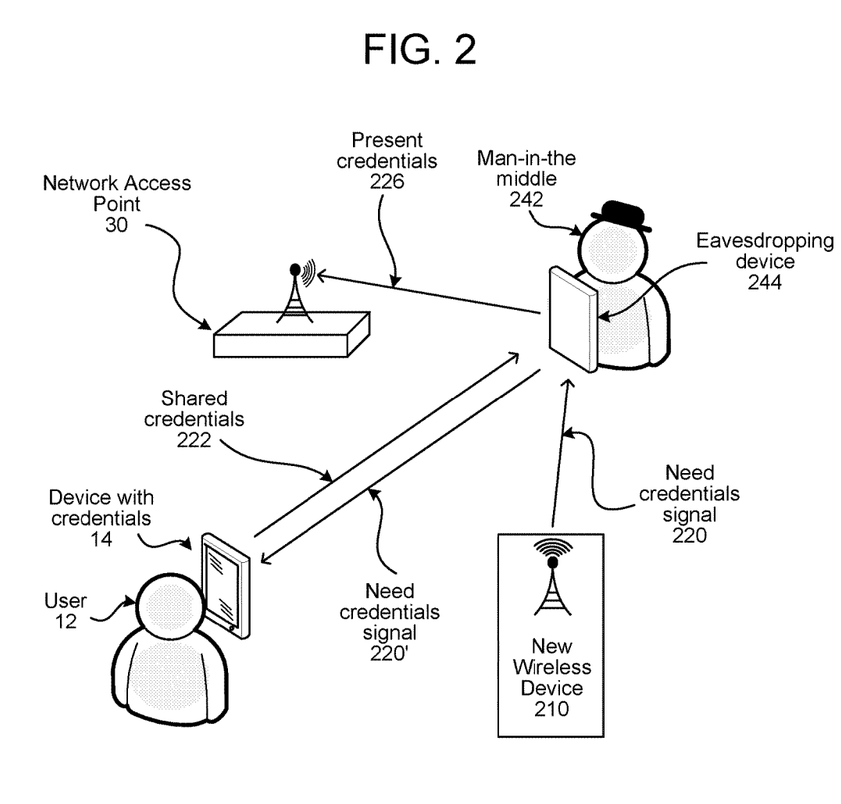
FIG. 2 illustrates an example of how a "man-in-the-middle" eavesdropper can intercept network credentials when a new device is added to the network.

FIG. 2 illustrates a similar system without such safeguards where a man-in-the-middle 242 penetrates communications. The new wireless device 210 broadcasts the signal 220 that announces that it needs credentials, but in this case, it is intercepted by an eavesdropping device 244 of the man-in-the-middle 242. The man-in-the-middle's device 244 either sends its own "need credentials signal" or relays a replicated version 220' of the need credentials signal 220 of the new wireless device 210 (i.e., "spoofing" signals to make it appear that eavesdropping device 244 is the new wireless device 210). The device with credentials 14 shares credentials 222 with the eavesdropping device 244, not recognizing that the eavesdropping device 244 is acting as a relay to the new wireless device 210. This may work because, among other strategies, the eavesdropping device 244 may be broadcasting at a higher power level than the new wireless device 210, such that the spoofed version of the wireless device 210 appears at the top of the list of available SSIDs. Having acquired the shared credentials 222, the eavesdropping device 244 may then present the credentials 226 to the network access point 30. As the eavesdropping device 244 may have also relayed the shared credentials 222 to the new wireless device 210, the fact that the credentials have been stolen may go unrecognized and undetected.

Figure 3:
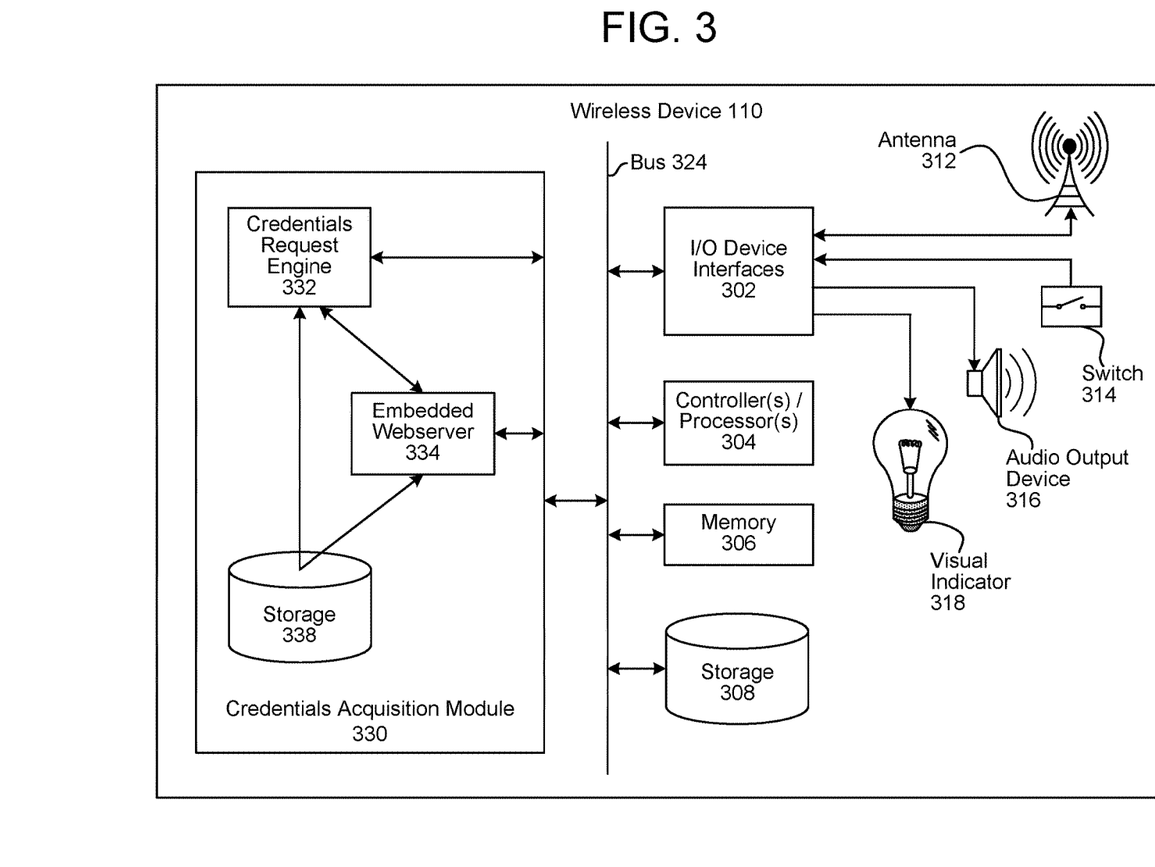
FIG. 3 is a block diagram conceptually illustrating example components of a network device that securely obtains network credentials.

FIG. 3 is a block diagram conceptually illustrating example components of the wireless device 110. In operation, the wireless device may include computer-readable and computer-executable instructions that reside in non-volatile (non-transitory) storage 308/338 on the device 110, as will be discussed further below.

As illustrated in FIG. 3, connected via input/output device interfaces 302, the device 110 may include one or more antennae 312 for wireless communications, a switch 314 for receiving user interactions, an audio output device 316 such as a speaker or a piezoelectric element, and one or more discrete visual indicators such as light emitting diodes (LEDs), carbon or tungsten filaments, fluorescent tubes, neon lights, lasers, etc. Examples of other I/O devices that may be connected via the input/output device interfaces 302 include a vibration generator for generating haptic vibrations, an electromagnet or field coil for generating an electromagnetic field, a laser, an LED that emits in a non-visible wavelength (e.g., infrared), an ultrasonic transducer, an electronic flash unit (e.g., a camera's flash), or the like.

While a "displayless" device may include discrete visual indicators such as an assortment of LEDs, if the device includes an array of LEDs arranged to form an LED display screen (e.g., one that can display text or icons), then the device is not displayless. Likewise, if the device supports an output port/link that will directly drive a display screen (e.g., VGA, HDMI, DVI, WiDi, etc.), then even though the device may lack an internal display, the support for the port/link means the device is not displayless.

The input/output device interfaces 302 may include, among other things, modem(s), radio transmitter(s), and radio receiver(s) needed to perform wireless communications. Among other protocols, the wireless communications supported may include wireless local area network (WLAN) protocols such as WiFi and Bluetooth, protocols such as WiMAX, and wireless universal serial bus (USB), as well as data communications over telecommunications networks such a Long Term Evolution (LTE).

The device 110 may include an address/data bus 324 for conveying data among components of the device 110. Each component within the device 110 may also be directly connected to other components in addition to (or instead of) being connected to other components across the bus 324.

The device 110 may include one or more controllers/processors 304, that may each include a central processing unit (CPU) for processing data and computer-readable instructions, and a memory 306 for storing data and instructions. The memory 306 may include volatile random access memory (RAM), non-volatile read only memory (ROM), non-volatile magnetoresistive (MRAM) and/or other types of memory. The device 110 may also include a data storage component 308, for storing data and controller/processor-executable instructions (e.g., instructions to perform the processes, communications transactions, and algorithms discussed with FIGS. 1, 5, 6A and 6B). The data storage component 308 may include one or more non-volatile storage types such as magnetic storage, optical storage, solid-state storage, etc. The device 110 may also be connected to removable or external non-volatile memory and/or storage (such as a removable memory card, memory key drive, networked storage, etc.) through the input/output device interfaces 302.

Computer instructions for operating the device 110 and its various components may be executed by the controller(s)/processor(s) 304, using the memory 306 as temporary "working" storage at runtime. The computer instructions may be stored in a non-transitory manner in non-volatile portions of memory 306, in storage 308, or on an external device. Alternatively, some or all of the executable instructions may be embedded in hardware or firmware in addition to or instead of software.

The device 110 further includes a credentials acquisition module 330 that performs the processes, communications transactions, and algorithms illustrated in FIGS. 1, 5, 6A, and 6B. The module 330 includes a credentials request engine 332 that controls the broadcasting of the SSID signal (or responds to "are you there" messages if operating as a "hidden" device without broadcasting an SSID), controls the embedded webserver 334, and performs determinations that may stop the process (516). Any unique information and the SSID name (or naming convention) recognized or used by the credentials acquisition module 330 may be stored in storage 338, which may be a subset of storage 308 or a non-volatile portion of memory 306. Web pages and any other user interface information that may be sent by the credentials request engine 332 or embedded webserver 334 may also be stored in storage 338.

The components of device 110 as illustrated in FIG. 3 are exemplary. Components may be added or left out, and the device 110 itself may be a stand-alone device or may be included, in whole or in part, as a component of a larger device or system.

Figure 4:
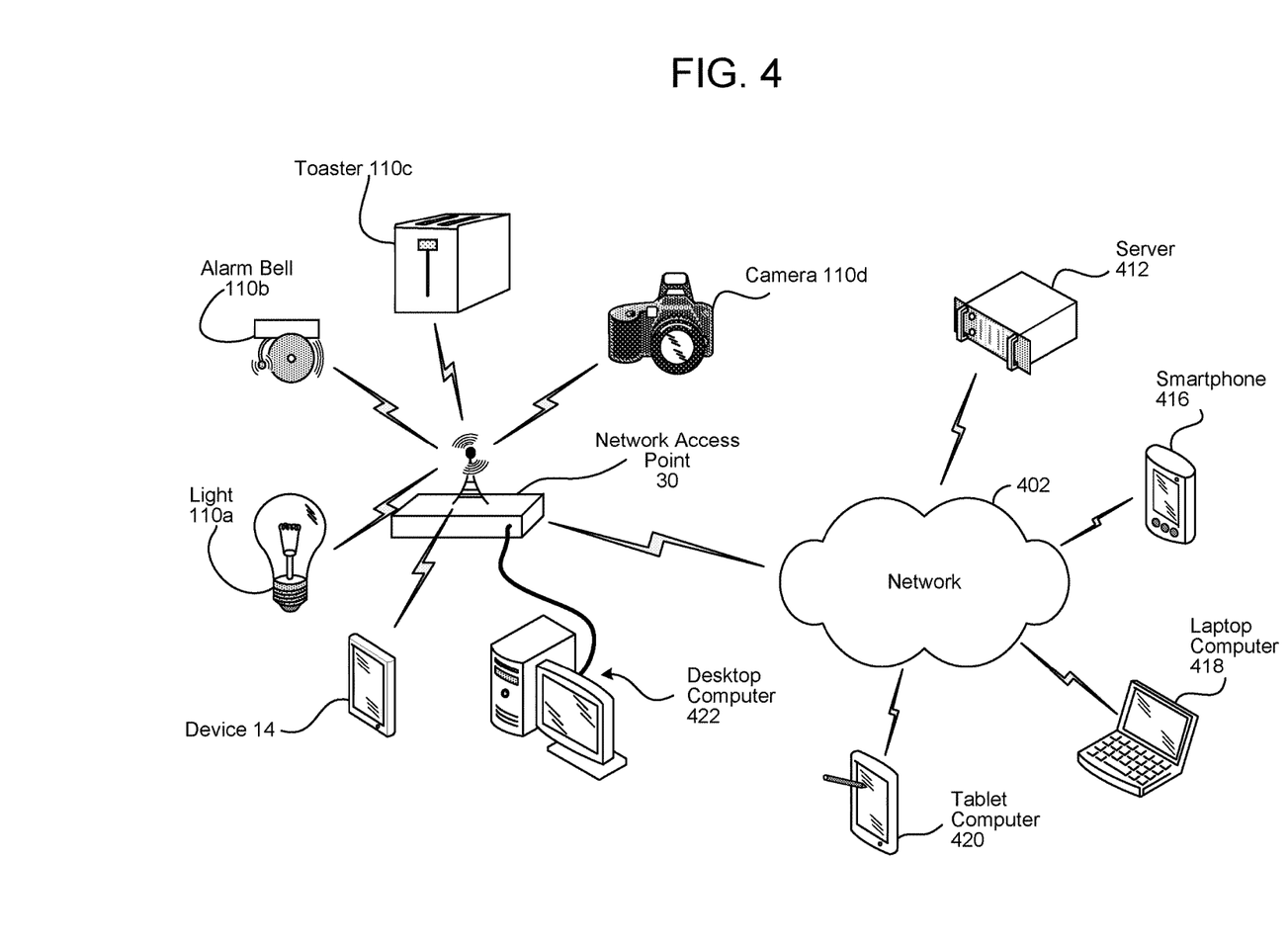
FIG. 4 illustrates an example of the local network integrating into a larger network.

As illustrated in FIG. 4, multiple devices wireless devices 110a to 110d may receive credentials and connect to the network access point 30. In the illustrated example, these wireless devices include a light bulb 110a, an alarm 110b, a toaster 110c, and a camera 110d. Other devices may also connect to the network access point by either wired or wireless connections, such as the device 14 that originally provided wireless credentials and a desktop computer 422.

Examples of other new devices 110 that may need credentials to connect to the network access point 30 include machine input devices (such as barcode/quick response (QR) code readers, radio frequency identification (RFID) readers, etc.), user input devices (such as a touch sensor, keyboard, mouse, trackpad, game controller, etc.), other input devices (such as a camera for a security or video game system, microphone, pressure sensor, thermometer or thermostat, smoke detector, proximity sensor, etc.), appliances, tools, game component, or any other kind of device or equipment.

As noted above, a new device 110 may use an indicator such as an LED (or other light) or microphone (or other audio output) to create a visual or audio indicator. New devices 110 may also generate the indicator in any number of ways depending on how the respective new devices 110 are configured. If a new device is configured with a vibration generator, it may generate an indicator through haptic feedback. The haptic feedback may serve as an indicator to a user or to another device configured to receive haptic input. If a new device is configured with an electromagnet or field coil it may generate an indicator using an electromagnetic field, such as using a lock open/release solenoid to create the electromagnetic field or otherwise creating an electromagnetic (EM) field that is detectable by a machine or by a user (for example a user with some sort of EM detector, like a magnet). If a new device is configured with a laser, the laser may be used to generate the indicator (such as outputting a laser in a particular shape, pattern, etc.). Radio signals using short-distance protocols (i.e., separate from the communication protocol where credentials are sought) may also be used to create an indicator that is detectable by an RF equipped device. Various other indicators may be used and may be detected by a user or by a device configured to detect the indicators.

The network access point 30 may connect the local network to a larger network 402 such as the Internet. Through this connection, remote devices such as a server 412, a smartphone 416, a laptop computer 418, and a tablet computer 420 may interact with the wireless device 110a to 110d.

Figure 5:
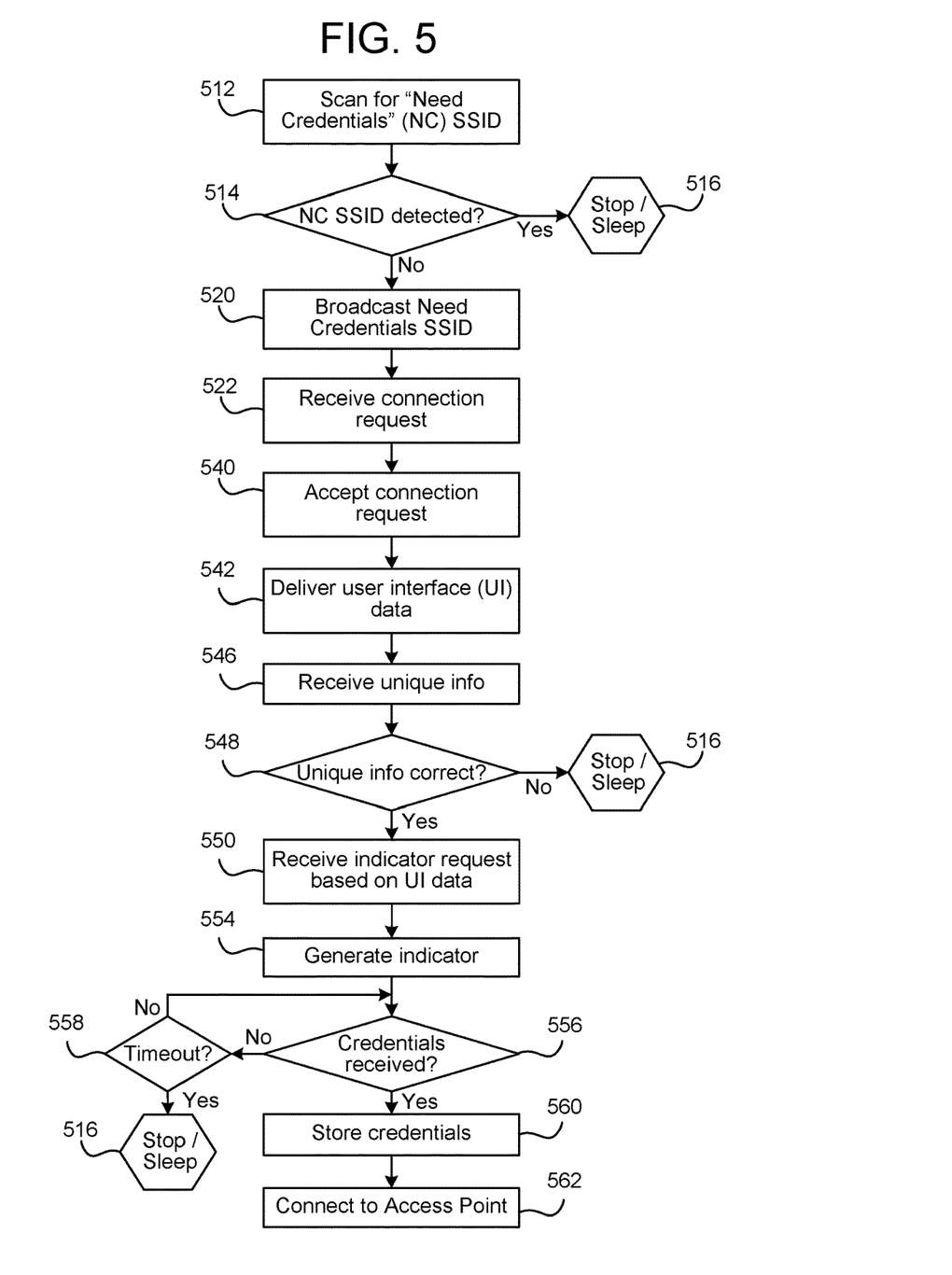
FIG. 5 illustrates an example of an algorithm that prevents a man-in-the-middle actively eavesdropping, implemented by a new device seeking network credentials.

FIG. 5 illustrates an example of an algorithm implemented by the credentials acquisition module 330 of the new device 110 seeking network credentials that mitigates the potential for eavesdropping by a man-in-the-middle. Initially, the new device 110 monitors or scans (512) for other devices broadcasting a "need credentials" service set identifier (SSID) beacon signal. "Scanning" may be performed by sequentially checking radio channels/bands, whereas "monitoring" may include scanning, but may also include checking a plurality (or all) radio channels/bands at a same time or otherwise listening to radio channels in some other fashion. As part of the monitoring, the new device 110 may monitor for other devices seeking wireless credentials, where the other devices are using the same protocol as the new device 110 to seek wireless credentials.

This monitoring or scanning by the new device 110 may be part of a sequential process performed as an individual step or steps, may be a continuous monitoring/scanning performed as a separate operation that is independent and parallel to other processes, or the device may concurrently perform a scan or monitor with other operations (e.g., automatically scan/monitor every time an operation is undertaken prior to obtaining credentials).

The SSID beacon signal may take the form of a "need credentials" (NC) prefix or similar indicia added to a name of the device (e.g., "NC_LightBulb00042"), and may only be broadcast when a new device 110 is seeking credentials, with the prefix or similar indicia differentiating the SSID from ordinary SSIDs broadcast by regular network wireless routers. However, other naming conventions may be used. such as using a unique name as the SSID for every new interaction (e.g., every time the device is powered, every time the device is instructed to obtain credentials such as when a button (e.g., switch 314 on the device is pushed)), and/or after another device either connects or attempts to connect but fails to provide credentials.

If another device's SSID beacon signal is detected (514 "Yes"), the process stops (516) and the new device 110 goes to sleep or into standby (i.e., timeout) for a specified time before monitoring/scanning (512) again. In the alternative, instead of going to sleep or into standby (516) before returning to the beginning (i.e., returning to monitoring/scanning 512 at the top of FIG. 5). the device may immediately loop back to the beginning (i.e., everywhere stop/sleep 516 appears in FIG. 5, instead return to the top of the figure).

The detection of another "need credentials" SSID signal may indicate that another new device has been installed, potentially creating confusion for the user 12 if they are manually connecting the device with credentials to the new devices, or if the names of the new devices are not unique (e.g., all new light bulbs of a certain model use an SSID of "NC_LightBulb00042"). It may also mean there is already a man-in the middle 242 nearby with an eavesdropping device 244, attempting to steal network credentials.

A detected need credentials SSID may be ignored (514 "No") if the type of device, as conveyed by its name is substantially different than the new device 110. For example, a new device 110 who uses "NC_LightBulb00042" is unlikely to be mistaken for "NC_Toaster00003," such that the new toaster's SSID may be ignored (514 "No"). In comparison, detection of an SSID that is the exact same or substantially the same (e.g., "NC_LightBulb00042" and "NC_LightBulb00107," such that the distinction between the SSID names may be ambiguous), where the same type of device is implicated by the SSID, may trigger (514 "Yes") a time-out (516) or an immediate loop back to the beginning of the process.

If no conflicting need credentials SSID is detected (514 "No"), the new device 110 broadcasts (520) its own "need credentials" SSID beacon and becomes receptive to accepting connections on an embedded web server (334 in FIG. 3). The new device 110 may send its request for network credentials using a same protocol as that used by a network access point. The new device 110 may communicate using the same protocol as the network access point, thus acting in a manner similar to a network access point in communications between the new device 110 and the credentialing device.

As an alternative, the new device 110 may operate in a "hidden" mode where it does not broadcast an SSID name, but instead waits for another device to call out its hidden name in an "are you there?" broadcast (as is sometimes done with WiFi routers in an effort to improve security). However, even "hidden" devices will appear as "unknown" using conventional SSID scanning techniques. Among other things, conventional scanning may detect the "unknown" device's radio channel, the encryption type (if any) used by the hidden device, and the hidden device's media access control (MAC) address. As such, even if operating with a "hidden" SSID, the credentials request engine 332 may monitor/scan (512) potential needs credentials SSIDs, although "hidden" devices that are not seeking credentials may generate false-positive detections (514 "Yes"), since their nature may be ambiguous.

While waiting for a device with credentials 14 to connect to the embedded webserver 334, the new device 110 may continue monitoring/scanning for other "need credentials" SSID signals (512), stopping or timing-out (516) if such a signal is detected (514 "Yes"). As an SSID collision-mitigation technique, to avoid a cycle of "need credentials" SSIDs broadcasting and then stopping when two contemporaneously activated new devices detect each other, the amount of time the new device 110 times out before trying again may be based in part on a random number and/or a number unique to the new device 110 (e.g., the duration of the time out may be based on a portion of the device's serial number).

The connections used by the credentials request engine 332 and embedded web server 334 to communicate with the device with credentials 14 may be open (HTTP), secure (HTTPS), or some other protocol. If HTTPS is used, it may employ self-signed certifications or "anonymous" secure sockets layer (SSL) security. Since even without a man-in-the-middle, HTTP transmissions may be vulnerable to eavesdropping, HTTPS plus a self-signed certificate or some other secure/encrypted protocol provides better security than an "open" unsecure protocol to mitigate the risk of "losing" credentials to a third party. Thus, it is advantageous for all transactions between the new device 110 and the device with credentials 14 to be conducted over secure and/or encrypted communication connections.

The web server 334 of the new device 110 receives a connection request 522, and if no other SSID is detected (514 "Yes"), accepts the connection request 540. At this point the credentials acquisition module 330 may not be able to determine if the connection request comes from the device with credentials 14 or another device.

The web server 334 then transmits (542) a user interface (UI) and/or data for a user interface to the connecting device. The user interface may be a web page and the data for the user interface may be for populating the webpage or may be something else such as data for an application on the connecting device that is designed to interface with the wireless device 110 (e.g., a new device controller "app").

If the device with credentials 14 does utilize a pre-loaded application for interacting with the wireless device 110, then the transmitted (542) UI data may be information to instantiate the device 110 with the user interface, with the established application on the device with credentials 14 providing the user interface itself. As an alternative to a conventional pre-loaded application on the device with credentials 14, the device with credentials may load a web-browser executable application provided over the network (402 in FIG. 4), such as browser-executable virtual-machine code downloaded from whomever fulfilled the order for, sold, or otherwise provides services for the wireless device 110, where the device with credentials 14 disconnects from the network access point 30 and connects to the new wireless device 110 after the browser-based application is loaded.

A user interface (e.g., of the web page, resident application, or browser-based application) may include a virtual button enabling the user 12 to cause the device with credentials 14 to signal the device 110 to provide an indicator such as blinking a light or making a sound. Instead of (or in addition to) a virtual button, the user interface may instruct the user to push a physical button (e.g., switch 314 in FIG. 3) on the new device 110.

The user interface may also ask that the user 12 provide information unique to the new device 110, such as to enter at least some of the serial numbers. If the unique information is requested and received (546), the new device 110 checks to see if the provided information is correct (548), determining whether the received information matches stored information. If it does not (548 "No"), the device may again stop and go to sleep/time-out (516). As an alternative, the device 110, may give the user 12 several tries to provide the unique information before timing out going to sleep (516), or otherwise prompt the user 12 via the user interface (UI) on the device with credentials 14 so that the user 14 is aware that they may have connected to a wrong device (such as a new device at the next door neighbor's).

If the unique information is correct (548 "Yes"), and the device receives a request to generate an indicator (550), the device generates the indicator 554. As noted above, this may be a simple indicator such as flashing a light or making a sound. More complicated indicators may also be used. For example, the flashing of the light or the laser may be an encoded signal or pattern to be picked up by a camera on the device with credentials 14, decoded by the device with credentials 14, and compared to other information such as a code written on the new device 110, or its packaging or manual, as a more secure method, also assuring that the device with credentials 14 and the device needing credentials 110 are in close proximity (which is less likely to be the case for the man-in-the-middle 242). The encoded light or laser may operate in either visible or invisible (e.g., infrared) wavelengths. Likewise, the speaker or transducer may produce an encoded sound or a pattern of sound to send the coded message, with a microphone on the device with credentials 14 picking up the sound, which the device with credentials 14 may then decode. The encoded sound may be audible or be ultrasonic. This decoding may be performed, for example, using processor-interpretable code transmitted to the device with credentials 14 by the webserver 334, may be built into a device control application loaded onto the device with credentials 14, etc. By using a sensor on the device with credentials 14 such as a camera, a microphone, a proximity sensor, an inertial motion sensor (e.g., a gyroscope and/or accelerometer, where the new device 110 uses its vibration generator to vibrate as the indicator and the device with credentials 14 is placed in direct contact with the new device 110 to detect the encoded or unencoded vibrations via the motion sensor), a magnetometer (e.g., the new device 110 uses its electromagnet or field coil to generate encoded or basic field fluctuations as the indicator and the magnetometer of the device with credentials 14 is placed in proximity to detect field fluctuations), etc., to detect the indicator, the device with credentials 14 may determine that communications with the new wireless device 110, issuing the shared credentials 22 on its own without further user 12 intervention.

Once the user 12 or the user's device 14 determines that the indicator that was correctly provided by the new wireless device 110, the device with credentials 14 transmits the shared credentials 22, which the device 110 receives (556 "Yes") and stores (560). While the device 110 is waiting on wireless credentials (556 "No"), a check is made as to whether the wait time exceeds a timeout threshold (558). If wait time does exceed the threshold (558 "Yes"), then the device 110 stops waiting for the credentials and goes to sleep or times out (516). If the wait time has not exceeded the threshold (558 "No"), the device 110 continues to wait for the credentials.

After the new device 110 stores the credentials (e.g., in storage 308/338 in FIG. 3), it may connect (562) to the network access point 30 whenever access is needed, and may only need new credentials again if the network access point 30 is replaced or reconfigured. The new device 110 may also turn off the broadcast of the need credentials SSID (or hidden NC SSID), since credentials are no longer needed (e.g., after confirming the credentials are valid by attempting to connect to the network access point 30). In connecting to the network the new device 110 may be authenticated with the network but may not necessarily maintain an active connection with the network.

While the new device may reject an indicator request if the unique information is incorrect (548 "No"), if the device with credentials 14 has linked to the man-in-the-middle instead of the new device 110, the man-in-the-middle may acquire the unique information. Thus, while using unique information associated with the new device 110 may be useful in the context of assuring that a user who has brought home multiple new identical devices is connecting to the correct device, the unique identification information may be of limited value as a security measure by itself. In comparison, a measure that provides a high degree of security is having the new device 110 generate (554) the indicator on request if-and-only-if there is a continued absence of another device broadcasting a need for credentials.

Whenever the new device is broadcasting its own SSID beacon signal (520) and detects a beacon signal that matches itself, in order to prevent the device from mistaking its own beacon signal as that of another device, it may modify the radio channel it is broadcasting on, modify the timing of the beacon signal, momentarily turn off its own beacon signal, etc., to determine whether it is seeing itself. If it was seeing itself, the detection is ignored. This check may be repeated as necessary each time there is detection of an SSID that has characteristics matching that of the device's own SSID (if the device is broadcasting an SSID). In comparison, if the detection is determined not to be a detection of the device's own SSID, it will be treated as a "positive" detection of another NC SSID (514 "Yes").

Figure 6A:
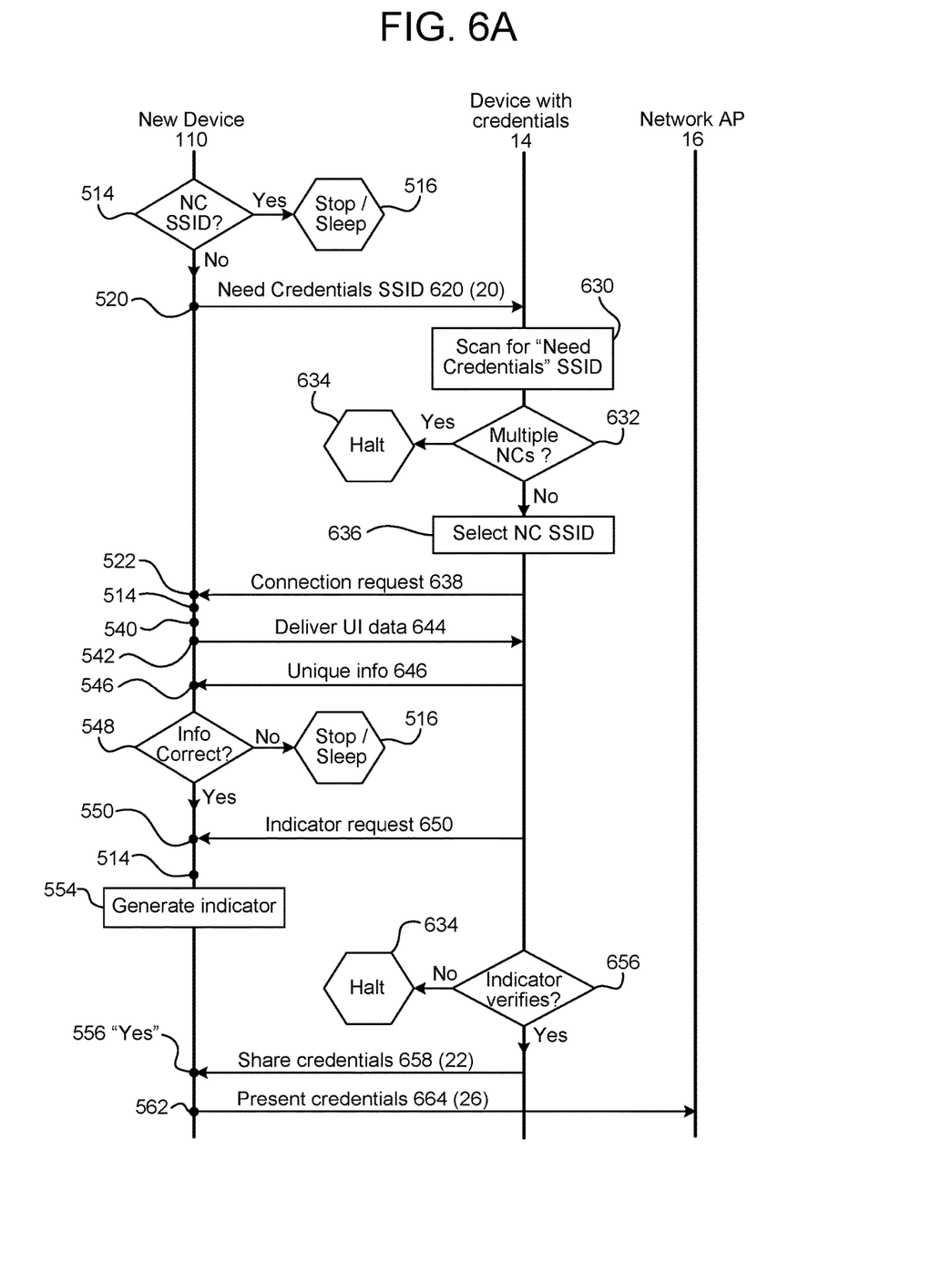
FIGS. 6A and 6B illustrate examples of signaling flow diagrams demonstrating variations on the algorithm in FIG. 5.

FIG. 6A is a signaling flow diagram demonstrating a further example based on the algorithm in FIG. 5. The device 110 may enter into the described configuration or credential acquisition mode when first plugged in, and/or when a user 12 triggers actuation such as by pressing a button included on the device 110 (e.g., holding switch 314 in FIG. 3 down for ten seconds, pressing it on-and-off three times in a row, etc.).

If, when the device 110 monitors/scans for other devices broadcasting a "need credentials" SSID signals (512), it detects (514 "Yes") a need credentials SSID broadcast by the man-in-the-middle (eavesdropping device 244) or some other device, the new device 110 stops the process and times-out (516). As noted in FIG. 5, instead of going into standby (516) before looping back to the top of the process, everywhere that stop/sleep 516 appears in the process flow, the new device 110 may instead immediately loop back to the top of the process.

If the device with credentials 14 detects the man-in-the-middle's "need credentials" SSID and connects to the eavesdropping device 244 (or a wrong new device), the eavesdropping device 244 will not be able to generate the indicator, thereby improving security since credentials will not be provided without the confirming an occurrence of the indicator.

If no other need credentials SSID is detected (514 "No"), the device 110 broadcasts (520) its own need credentials SSID (20/620). This beacon signal may be picked up by every device within range, including not just the device with credentials 14, but also an eavesdropping device 244. If the eavesdropping device 244 then broadcasts either its own SSID or a reproduction of the new device's own SSID (e.g., spoofed SSID 220') in an attempt to hijack the device with credentials 14, the new device detects the broadcast (514 "Yes") and again goes to sleep 516.

The new device's own "need credentials" SSID may be generic to the type of device (e.g., all light bulbs of a certain model may use the same SSID name) or may be unique to the device (e.g., a name including part of the device's serial number or some other unique indicia). If the SSID (20/620) is unique, the eavesdropping device 244 might nonetheless replicate the SSID information (220') to spoof the device with credentials 14 into connecting (especially since the device 110 will go to sleep 516 when the spoofed SSID 220' is detected). For this reason, although a unique SSID may be used, it is not—by itself—considered to be an effective means of security.

As a variation on using a unique name as the SSID, the new device 110 may change the name of its need credentials SSID with every interaction. For example, the new device 110 begins by beaconing "NeedCred1" as its SSID, and every time a physical button is pressed on the new device 110 (e.g., switch 314), the device name is incremented, such as "NeedCred2," "NeedCred3," etc. This may more effectively let the user 12 know which device was broadcasting. But connection validation based on verification of the indicator (554 and 656 "Yes") still provides improved security against the man-in-the-middle 242 after wireless association (540) of the device with credentials 14 to the new device 110 to protect against the man-in-the-middle spoofing the SSID immediately after the SSID name changes (i.e., assuring that the connection is actually with the new device 110 and not between the device with credentials 14 and the man-in-the-middle, since the new device 110 will not generate the indicator (554) if the spoofed SSID is detected (514 "Yes")).

The device with credentials 14 scans (630) for "need credentials" SSID signals. This may be done automatically by software on the device with credentials 14 that is designed to connect to and control the new device 110 (e.g., a device control "app"), or may be the user 12 reviewing the device names included in SSID signals received by the device with credentials 14, as is commonly done by users when connecting to new access points. If multiple "need credentials" SSIDs are detected (632 "Yes"), the user 12 or the device with credentials 14 may halt (634) the process. However, the user might connect to one of the SSIDs anyway, either intentionally or by mistake. If the device with credentials 14 does connect to the man-in-the-middle's device, the eavesdropping device 244 should not be able to generate the indicator (554), so credentials are still protected.

If the device with credentials 14 selects (636) the needs credential SSID and signals for a connection 638 to the new device 110, the device 110 receives (522) and accepts the connection (540) (if no other SSID are detected), and transmits (542) the user interface data 644. In case the man-in-the-middle 242 is spoofing the device with credentials 14 and the new device 110 accepts its connection, the user interface may include a request for unique information such as a portion of the new device's serial number, which ordinarily the man-in-the-middle 242 will not possess. Traditional cryptographic techniques may be employed, such as a keyed-hash message authentication code (HMAC), a digital signature algorithm (DSA), etc.

If the new device 110 receives (546) the unique information 646 (if requested), it is correct (548 "Yes"), and a request (650) is received (550) to generate the indicator, the device 110 device may generate the indicator (554) if no other SSID is detected (514 "No"). If the unique information is incorrect (548 "No") or another SSID is detected (514 "Yes"), then the process stops or times-out (516).

Even if the man-in-the-middle manages to steal the unique information during one communication session and then imposes itself in on a subsequent session when the new device 110 again attempts to acquire credentials, integrity is still maintained since new device 110 will time-out (516) when it detects the man-in-the-middle's SSID, such that the indicator will not be provided by the device with credentials 14.

The device with credentials 14 and/or the user 12 verifies the indicator 656. If it is incorrect (656 "No"), the process may halt (634). Otherwise, (656 "Yes"), the device with credentials 14 shares credentials 658 (22) with the new device 110, the new device receiving (556 "Yes") the credentials. The new device may then connect (562) to the network access point 30, presenting the credentials (26/664) to the access point 30, in response to which the access point 30 authorizes access a connected network (e.g., network 402 in FIG. 4).

Figure 6B:
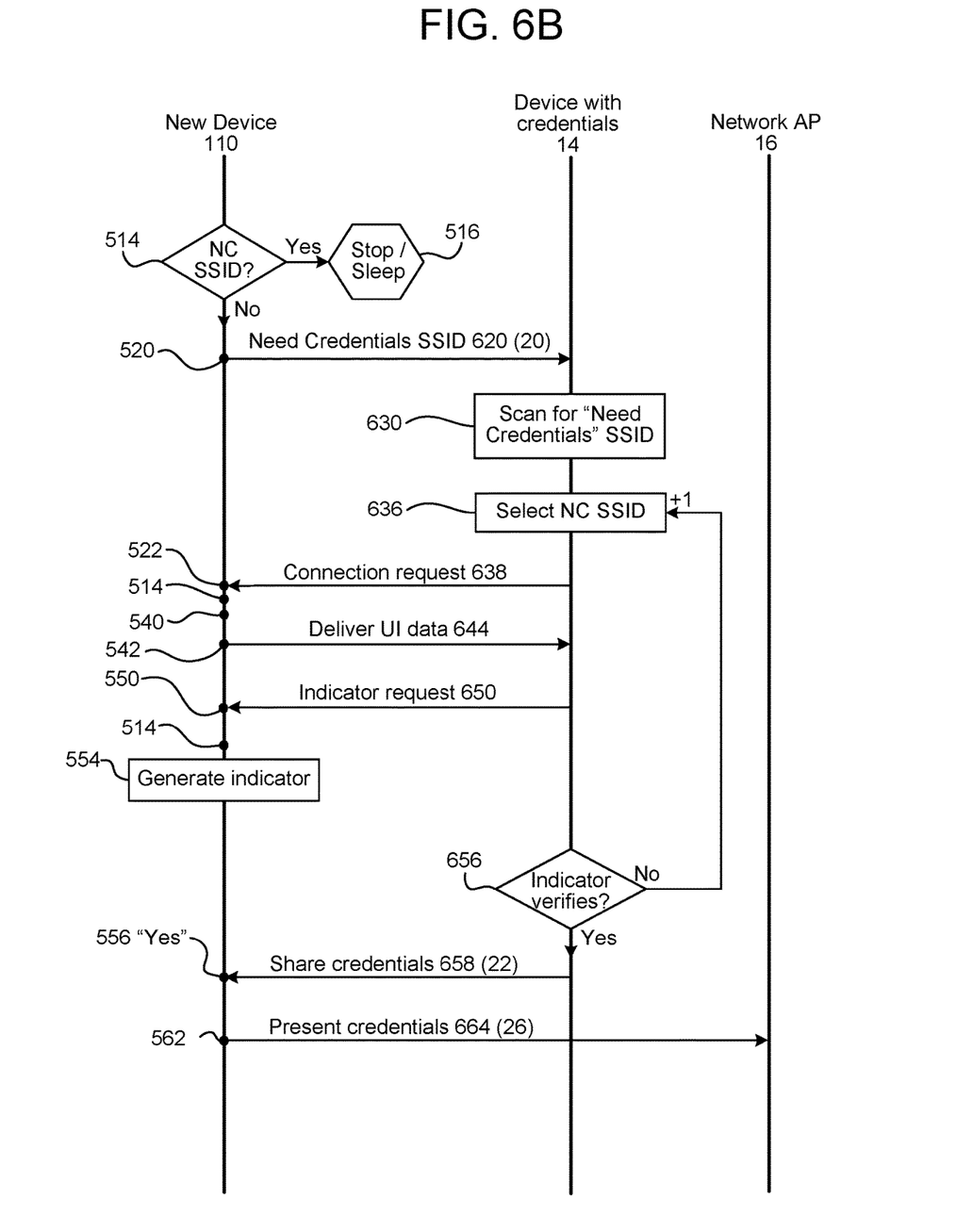

FIG. 6B is another signaling flow diagram demonstrating a further example based on the algorithm in FIG. 5. Two differences with FIG. 6A are that the unique information exchange is omitted (546, 646, 548) and the device with credentials 14 will attempt to connect without regard to how many need credentials SSIDs are present, If unable to verify the indicator from a connected device (656 "No"), the device with credentials 14 will drop the connection and attempt to connect to another need credentials SSID (e.g., a next "detected" NC SSID).

The use of the unique information (546, 646, 548) may be added in FIG. 6B, but was omitted for purposes of the illustration of FIG. 6B as a purpose of using the unique identifier is to confirm that the user has connected to the correct device and the try-and-repeat process will get to the correct device eventually.

Having the device with credentials 14 not halt when multiple SSID are detected helps avoid someone not being able to register their new devices due to an SSID stalemate when a nearby broken or "rogue" device continually transmits an NC SSID, or the device with credentials 14 is unable to differentiate between NC SSID and ordinary SSIDs of nearby network access points, or someone nearby is maliciously broadcasting an NC SSID to fish for connections or to prevent others from registering their devices.

Many of the steps illustrated in FIGS. 1, 5, 6A, and 6B can be done in other orders while still retaining a degree of security against man-in-the-middle attacks, and some steps may be omitted entirely. Additional steps may also be added. For example, if a device with credentials 14 uses an application to connect to and control wireless device 110, and information regarding the wireless device 110 is linked to a user's account (e.g., linking the serial number and name of the unique SSID to the user account at the time of purchase), then the application on the device with credentials 14 may automatically look for specific unique SSID names associated with the purchased devices, or may probe for a "hidden" new device 110 that is not broadcasting an SSID but responds when the device with credentials 14 probes for it by calling out the new device's name in an "are you there?" broadcast (an imperfect security measure since the man-in-the-middle may acquire sufficient information to spoof the hidden device by responding to the "are you there?" broadcast). Since the device with credentials 14 may also obtain other information based on such linkage, little or no input may be required from the user 12 in order to validate the new device. Specific encoding or encryption schemes embedded on the wireless device 110, as well as certificate information may also be shared with the device with credentials 12 via the user's account, further increasing security.

As noted, as alternative to the embedded webserver 334 serving web page or pages as the delivered UI data (644), a standalone "app" resident on the device with credentials 14 may be used, or a web-browser executable code received from whomever fulfilled the order for, sold, or otherwise provides services for the wireless device 110 (e.g., from a server 412 in FIG. 412 with privileges to a user's (12) account). As an alternative to HTTP and HTTPS, the embedded webserver 334 may use any protocols including protocols not based on HTTP, as well as use other cryptographic techniques for privacy (e.g., Diffie-Hellman).

Advantages to this approach include the ability to use self-signed certifications and "anonymous" secure sockets layer (SSL) security with security comparable to expensive and more complicated third-party authenticated certificates, low computational overhead, and the ability to be done dynamically and securely at any time, even if the new device 110 has been reset to "factory defaults."

Aspects of the disclosed system may be implemented as a computer method or as an article of manufacture such as a memory device or non-transitory computer readable storage medium containing instructions to be loaded onto the wireless device 110. The computer readable storage medium may be readable by a computer and may comprise software and/or firmware instructions for causing the controller(s)/processor(s) 304 of the wireless device 110 to perform processes and algorithms described above. The computer readable storage medium 308 may be implemented by a volatile computer memory, non-volatile computer memory, hard drive, solid-state memory, flash drive, removable disk and/or other media.

The credentials request engine 332 may be implemented as firmware or software implemented by the controller(s)/processor(s) 304, along with the embedded webserver 334. In addition, part or all of the credentials request engine 332 may be implemented in hardware. For example, portions of the credentials request engine 332 may be a state machine implemented as logic on an application specific integrated circuit (ASIC) or by a field programmable gate array (FPGA).

Although the processes, communications transactions, and algorithms discussed with FIGS. 1, 5, 6A and 6B are particularly well suited for displayless devices and devices with limited means of direct data entry, the disclosed system may also be used with more conventional computing devices that do have displays but that need credentials when joining a new network.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, digital and wireless communications, and/or encryption, should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

As used in this disclosure, the term "a" or "one" may include one or more items unless specifically stated otherwise. Further, the phrase "based on" is intended to mean "based at least in part on" unless specifically stated otherwise.

What is claimed is:
1. A first device, comprising:
   at least one hardware processor;
   at least one means for audio output; and
   at least one memory including instructions that, when executed by the at least one processor, cause the first device to:
      determine a first period of time has elapsed without detecting a first signal indicating a second device is requesting wireless network credentials of a network;
      after the first period of time has elapsed, commence sending of a second signal requesting the wireless network credentials;
      after commencing sending of the second signal, detect (i) the first signal or (ii) a third signal requesting the wireless network credentials;
      based at least in part on detecting the first signal or the third signal, stop sending of the second signal;
      after stopping sending of the second signal, determine a second period of time has elapsed without detecting a fourth signal requesting the wireless network credentials;

after the second period of time has elapsed, (iii) resume sending of the second signal or (iv) send a fifth signal requesting the wireless network credentials;
receive a sixth signal from a third device, the sixth signal responding to the second signal;
after receiving the sixth signal, generate sound from the at least one means for audio output;
after generating the sound, receive the wireless network credentials from the third device; and
use the wireless network credentials to connect to a network access point device of the network.

2. The first device of claim 1, wherein:
the at least one means for audio output comprises at least one of a speaker, transducer, or piezoelectric element; and
the sound is audible or ultrasonic.

3. The first device of claim 1, wherein the sound represents a message based on information unique to the first device.

4. The first device of claim 1, wherein the at least one memory further includes instructions that, when executed by the at least one processor, further cause the first device to:
send a seventh signal to the third device, the seventh signal requesting information unique to the first device;
after sending the seventh signal, receive an eighth signal from the third device; and
determine the eighth signal includes the information,
wherein the at least one means for audio output generates the sound after determining the eighth signal includes the information.

5. The first device of claim 1, wherein the first device uses a wireless communications protocol to send the second signal and connect to the network access point device.

6. A first device, comprising:
at least one hardware processor; and
at least one memory including instructions that, when executed by the at least one processor, cause the first device to:
determine a first period of time has elapsed without detecting a first signal indicating a second device is requesting wireless network credentials;
after the first period of time has elapsed, commence sending of a second signal requesting the wireless network credentials of a network;
after commencing sending of the second signal, detect (i) the first signal or (ii) a third signal requesting the wireless network credentials;
based at least in part on detecting the first signal, stop sending of the second signal;
after stopping sending of the second signal, determine a second period of time has elapsed without detecting a fourth signal requesting the wireless network credentials;
after the second period of time has elapsed, (iii) resume sending of the second signal or (iv) send a fifth signal requesting the wireless network credentials;
receive a sixth signal from a third device, the sixth signal responding to the second signal;
after receiving the sixth signal, activate an indicator;
after activating the indicator, receive the wireless network credentials from the third device; and
use the wireless network credentials to connect to a network access point device of the network.

7. The first device of claim 6, wherein the indicator represents a message based on information unique to the first device.

8. The first device of claim 6, wherein the indicator comprises at least one of light, sound, vibration, or an electromagnetic field.

9. The first device of claim 6, wherein the at least one memory further includes instructions that, when executed by the at least one processor, further cause the first device to:
send a seventh signal to the third device, the seventh signal requesting information unique to the first device;
after sending the seventh signal, receive an eighth signal from the third device; and
determine the eighth signal includes the information,
wherein the first device activates the indicator after determining the eighth signal includes the information.

10. The first device of claim 6, wherein the first device uses a wireless communications protocol to send the second signal and connect to the network access point device.

11. A method performed by a first device, comprising:
determining hardware processor of the first device, a first period of time has elapsed without detecting a first signal indicating a second device is requesting wireless network credentials of a network;
after the first period of time has elapsed, commencing sending of a second signal requesting the wireless network credentials;
after commencing sending of the second signal, detecting (i) the first signal or (ii) a third signal requesting the wireless network credentials;
based at least in part on detecting the first signal, stopping sending of the second signal;
after stopping sending of the second signal, determining a second period of time has elapsed without detecting a fourth signal requesting the wireless network credentials;
after the second period of time has elapsed, (iii) resuming sending of the second signal or (iv) sending a fifth signal requesting the wireless network credentials;
receiving a sixth signal from a third device, the sixth signal responding to the second signal;
after receiving the sixth signal, activating an indicator;
after activating the indicator, receiving the wireless network credentials from the third device; and
using the wireless network credentials to connect to a network access point device of the network.

12. The method of claim 11, wherein activating the indicator comprises outputting a message based on information unique to the first device.

13. The method of claim 11, wherein activating the indicator comprises at least one of activating a light, outputting a sound, outputting a vibration, or outputting an electromagnetic field.

14. The method of claim 11, further comprising:
sending a seventh signal to the third device, the seventh signal requesting information unique to the first device;
after sending the seventh signal, receiving an eighth signal from the third device; and
before activating the indicator, determining the eighth signal includes the information.

15. The method of claim 11, further comprising using a wireless communications protocol to send the second signal and connect to the network access point device.

16. The first device of claim 6, wherein the at least one memory further includes instructions that, when executed by the at least one processor, further cause the first device to:
activate the indicator in response to receiving the sixth signal.

17. The first device of claim 6, wherein the first device is a displayless user device and the third device is a user device including a display.

18. The first device of claim 6, wherein the at least one memory further includes instructions that, when executed by the at least one processor, further cause the first device to:
   receive, from the third device, the wireless network credentials in response to the third device detecting the indicator.

19. The first device of claim 1, wherein the first device is a displayless user device and the third device is a user device including a display.

20. The method of claim 11, wherein the first device is a displayless user device and the third device is a user device including a display.

* * * * *